United States Patent [19]

Locotos

[11] Patent Number: 4,708,559

[45] Date of Patent: Nov. 24, 1987

[54] REINFORCING WASHER FOR A MINE ROOF BOLT ASSEMBLY

[75] Inventor: Frank M. Locotos, Bridgeville, Pa.

[73] Assignee: F. M. Locotos Co., Inc., McMurray, Pa.

[21] Appl. No.: 883,168

[22] Filed: Jul. 8, 1986

[51] Int. Cl.$^4$ ............................................. F16B 43/02
[52] U.S. Cl. .................................... 411/545; 411/531; 405/259
[58] Field of Search .............. 411/531, 537, 538, 545, 411/943, 9–11; 405/259–261

[56] References Cited

U.S. PATENT DOCUMENTS

| | | | |
|---|---|---|---|
| 2,850,937 | 9/1958 | Ralston | 411/11 |
| 3,090,203 | 5/1963 | Durget | 61/45 |
| 3,133,468 | 5/1964 | Cumming | 411/11 |
| 3,238,731 | 3/1966 | Seiffert et al. | 405/259 |
| 3,415,064 | 12/1968 | Talobre | 405/259 |
| 4,026,183 | 5/1977 | Bart . | |
| 4,112,693 | 9/1978 | Collin et al. | 405/132 |
| 4,183,699 | 1/1980 | Donan, Jr. et al. | 405/259 |
| 4,188,158 | 2/1980 | Donan, Jr. et al. | 405/259 |
| 4,249,835 | 2/1981 | White | 405/259 |
| 4,275,975 | 6/1981 | Morgan | 411/44 X |
| 4,371,293 | 1/1983 | Wilcox et al. | 405/132 |
| 4,445,808 | 5/1984 | Arya | 405/259 |
| 4,467,581 | 8/1984 | Francovitch | 52/410 |
| 4,476,660 | 10/1984 | Francovitch | 52/515 |
| 4,607,984 | 8/1986 | Cassidy | 405/259 X |

FOREIGN PATENT DOCUMENTS

| | | | |
|---|---|---|---|
| 2624233 | 12/1977 | Fed. Rep. of Germany | 405/259 |
| 3403688 | 9/1985 | Fed. Rep. of Germany | 405/259 |
| 1304298 | 4/1962 | France | 405/259 |
| 1131954 | 10/1968 | United Kingdom | 411/72 |

*Primary Examiner*—Neill Wilson
*Attorney, Agent, or Firm*—Webb, Burden, Robinson & Webb

[57] ABSTRACT

A reinforcing washer for use in a mine roof bolt assembly comprising a roof bolt having a shaft portion, an embossed bearing plate having a surface which substantially contacts the mine roof, an opposite surface and an aperture through which the roof bolt extends, said washer comprising a rigid member having a first surface shaped to substantially contact and complement the opposite surface of the bearing plate, an opposite surface and an aperture through which the roof bolt extends. Preferably, the shape of the embossed bearing plate and the rigid member is a cup or donut. Most preferably, the washer has a substantially uniform thickness and is manufactured from hardened steel.

9 Claims, 6 Drawing Figures

REINFORCING WASHER FOR A MINE ROOF BOLT ASSEMBLY

FIELD OF THE INVENTION

This invention relates to the field of mine roof bolt assemblies. More particularly, the invention relates to a reinforcing washer for use with a roof bolt and a support or bearing plate.

BACKGROUND OF THE INVENTION

Typically, mine roof bolting assemblies comprises a threaded roof bolt, which may include one or more sections; a bearing plate; and a nut for holding the bearing plate against the mine roof when the bolt is installed in a bolt hole drilled into the mine roof. Many roof bolting assemblies utilize threaded or non-threaded roof bolts wherein the bolt is driven by the bolt head which has a collar for supporting a bearing plate against the mine roof. The bearing plates are usually made from steel or other strong metal material, are embossed with a dome, bell, cup, donut or other shape, and include a central aperture through which the roof bolt extends. Such bearing plates are shown in U.S. Pat. Nos. 3,090,203 and 4,445,808. Sometimes the bearing plates are provided with reinforcing ribs or sidewalls as shown in U.S. Pat. Nos. 4,112,693 and 4,371,293.

In some mine roof bolting assemblies, flexible, annular washers or gaskets have been placed between the mine roof and the bearing plate for excluding ambient air and moisture from the bolt hole to prevent spalling or crumbling of the sidewalls of the bolt hole. Such sealing devices are shown in U.S. Pat. Nos. 4,183,699 and 4,188,158.

Anti-friction washers have also been used in roof bolting assemblies. They are placed between the bearing plate and the nut or head of a bolt. The purpose of these washers is to relieve friction between the plate and the nut or bolt head, thereby permitting application of a more consistent torque on the roof bolt during installation. The washers also prevent the roof bolt head, nut or other securing means from being pulled through the aperture in the bearing plate. A typical anti-friction washer is flat, approximately ⅛ inch (0.317 cm) thick, square or round with a 2 inch (5.08 cm) side or diameter and hardened to Rockwell C 35-45 range.

Roof bolting assemblies provided with such flat anti-friction reinforcing washers are adequate for normal loading, but are inadequate under heavy loading. For example, a Grade 55, ⅝ inch (1.58 cm) bolt has a load strength in the range of 15,000 to 17,000 pounds. Typically, such a bolt is combined with a 6"×6"×3/16" (15.2×15.2×0.476 cm) bearing plate embossed with a donut or cup shape to produce a bolting assembly with a load capacity of about 20,000 pounds.

With the appearance of stronger primary roof bolts, such as a ¾ inch (1.91 cm), Grade 75 roof bolt, assemblies having load strengths in excess of 31,000 pounds became possible. In order to achieve these higher assembly load strengths, the thickness of the bearing plate was increased, and usually doubled. The thicker bearing plate was also flattened for easier manufacturing. Then it was coupled with a thin, flat, annular anti-friction washer. However, by making the bearing plate thicker and flatter, the strength advantages from embossing were lost. In addition, substantially more material was required to produce the thicker, flat bearing plate than the earlier embossed plate.

I have found that all of the strength advantages of an embossed bearing plate can be retained by reinforcing it with a washer having a shape that is complementary to the embossed plate, instead of with a flat washer. My reinforcing washer also substantially reduces the manufacturing costs of existing mine roof bolt assemblies. Instead of sacrificing the loading capacity of such assemblies, my invention rather surprisingly increases it.

SUMMARY OF THE INVENTION

I have invented a novel reinforcing washer for a mine roof bolting assembly. The washer comprises a rigid member, preferably made of hardened steel, in the form of an annulus, rectangle, or other suitable shape made by stamping or the like. In the case of an annular washer adapted for use with a 6 inch (15.2 cm) bearing plate, the thickness of the washer is ⅛ inch (0.317 cm), and includes a substantially planar central portion of about 2 inches (5.08 cm) diameter having a central aperture through which a roof bolt extends. The planar portion extends into a slightly tapered annulus which terminates in an annular skirt portion such that the overall diameter of the washer approximates 3 inches (7.62 cm). The shape of the washer complements the embossment of a bearing plate with which it is used. In the case of a bearing plate having a cup shaped embossment, the flat, planar portion of the washer fits within the cup shape of the bearing plate. In the case of a bearing plate embossed with a donut shape, the planar portion of the reinforcing washer fits over and complements the convex portion of the embossment.

It has been found in actual tests that the strength capacity of a roof bolt assembly including an embossed bearing plate is increased from about 15-17,000 pounds to between about 24-29,000 pounds when coupled with my reinforcing washer having substantially less thickness than existing flat washers.

DETAILED DESCRIPTION OF PREFERRED EMBODIMENTS OF THE INVENTION

Figure 1:
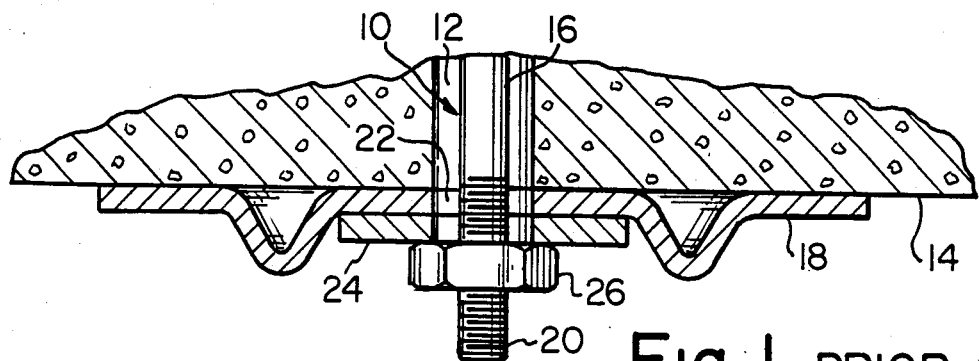
FIG. 1 is a partial cross-section of a prior art roof bolting assembly installed in a mine roof.

Referring to FIG. 1, a prior art roof bolt 10 is installed in a hole 12 drilled into the roof 14 of a mine. It is secured by adhesives, resins, or other anchoring means (not shown). The roof bolt 10 includes a shank 16. An embossed bearing plate 18 is placed over the threaded end 20 of the shank which extends through aperture 22 in the bearing plate. A flat washer 24 is placed over the threaded end 20 and the assembly is tightened by a hexagonal nut 26 onto end 20.

Tests made of the assembly shown in FIG. 1, including a high strength steel bearing plate 6" (15.2 cm) square and embossed with a donut shape coupled with a 2" (5.08 cm) diameter, ⅛" (0.317 cm) thick flat round washer, report an ultimate strength of about 23,500 pounds.

Using an 8 inch (20.3 cm) square bearing plate of regular strength steel embossed with a donut shape together with a 2" (5.08 cm) diameter hard round washer of ⅛" (0.317 cm) thickness as shown in FIG. 1, an average ultimate test strength of 24,000–25,000 pounds was achieved.

Figure 2:
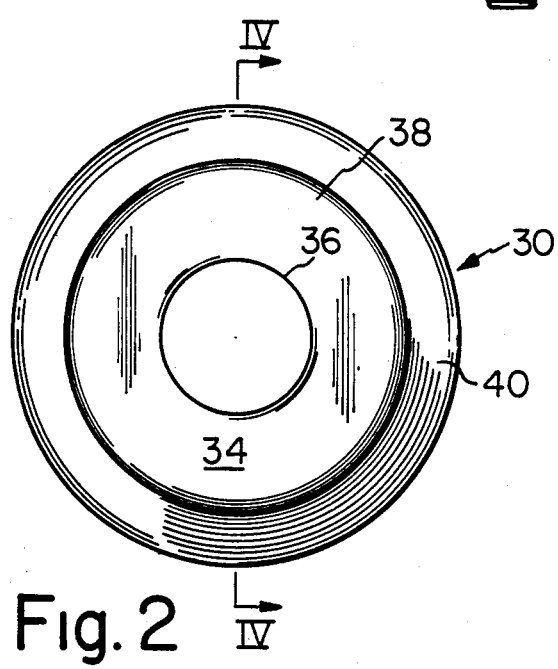
FIG. 2 is a top plan view of an embossed reinforcing washer according to the invention.
Figure 3:
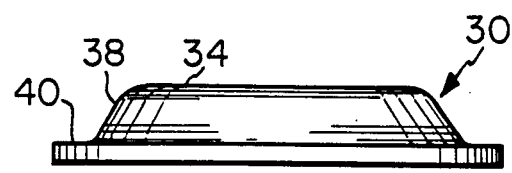
FIG. 3 is a side elevational view of the washer of FIG. 2.
Figure 4:
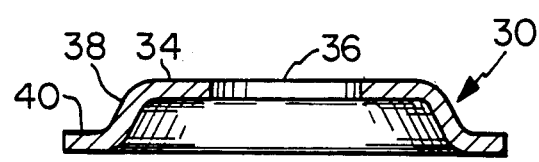
FIG. 4 is a section taken through the washer along lines IV—IV of FIG. 2.
Figure 5:
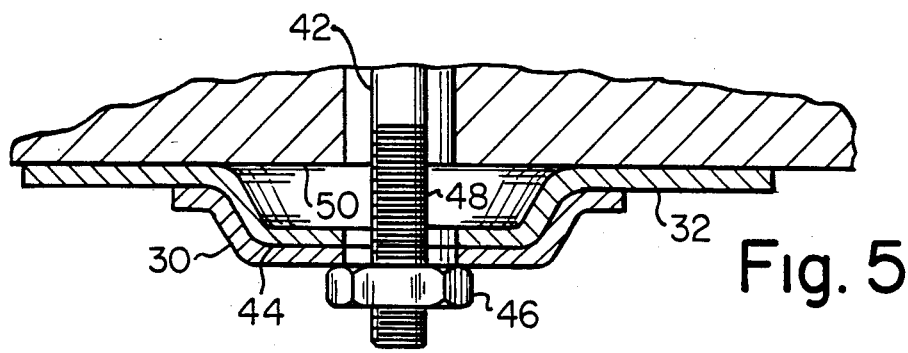
FIG. 5 is a partial cross-section of an installed roof bolt assembly including an embossed bearing plate in the form of a cup coupled with my new reinforcing washer.
Figure 6:
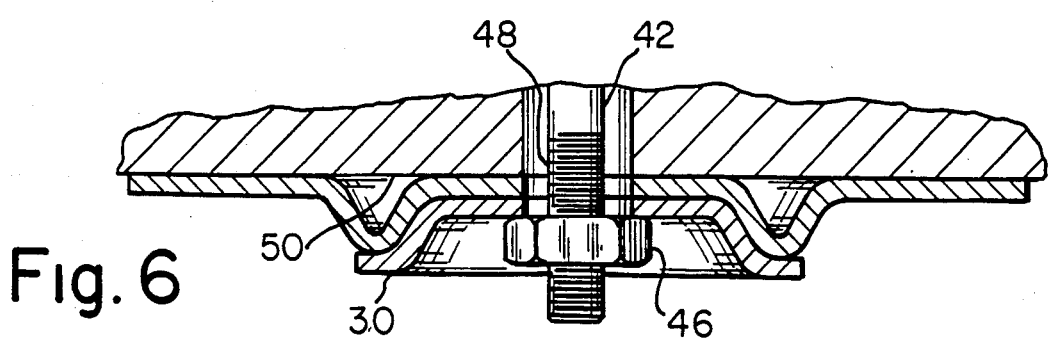
FIG. 6 is a partial cross-section of an installed roof bolt assembly including an embossed bearing plate in the form of a donut coupled with my new reinforcing washer.

The improved reinforcing washer 30 according to the invention shown in FIGS. 2-4 permits ultimate strengths of up to about 40,000 pounds to be achieved when used with an embossed bearing plate 32 in either the cup form shown in FIG. 5 or the donut form shown in FIG. 6.

Specifically, the washer 30 comprises a rigid member in the form of an annulus preferably having a thickness of about ⅛" (0.317 cm) and an overall diameter of about 3 inches (7.62 cm). The washer has a central substantially planar portion 34 of about 2" (5.08 cm) in diameter with a central aperture 36 through which a roof bolt extends. The planar portion 34 extends into a slightly tapered annulus 38 which terminates in an annular skirt portion 40.

The configuration of the washer 30 is complementary to either a cup shaped or a donut shaped bearing plate, such that when the washer is installed with a bearing plate of either shape in a roof bolt assembly, the adjoining surfaces of the bearing plate mate with a major portion of the washer 30.

As shown in FIG. 5, embossed bearing plate 32 is first placed on roof bolt 42. The plate is embossed with a cup shape. The washer 30 is placed on the bolt 42 such that lower surface 44 of the plate complements and contacts with the upper surface of the washer. A securing means or nut 46 threaded to shank end 48 of the bolt retains the washer and plate in position on the roof bolt and against the roof 50 of the mine.

By inverting the washer 30, it can also be used with a bearing plate 52 embossed with a donut shape as shown in FIG. 6. The washer 30 fits over the plate 52, as shown, with adjoining surfaces mating in a complementary and contacting relationship. The plate 52 and washer 30 are retained on the threaded end 48 of the roof bolt 42 by a hexagonal nut 46 which secures them on the roof bolt and against the roof 50 of the mine.

The same principles apply where the roof bolt includes other securing means such as a head adapted to be driven by a bolter. The head of the bolt retains the washer and bearing plate against the mine roof, with the washer fitting against the plate as shown in either FIG. 5 or FIG. 6.

To demonstrate the substantial improvement in the ultimate strength of a roof bolt assembly using my reinforcing washer over assemblies using a flat washer, tests were made at the Bruceton Safety Technology Center of the Mine Safety and Health Administration (MSHA), U.S. Department of Labor, between Sept. 20 and Sept. 24, 1985. The results of those tests follow:

TEST NO. 1

Ten 6"×6"×0.183" (15.2×15.2×0.465 cm) Tazwell Industries embossed bearing plates, including a 1⅜" (3.49 cm) diameter center aperture were tested with a 3" (7.62 cm), 0.134" (0.340 cm) thick donut washer having a ¾" (1.91 cm) aperture therethrough.

All plates tested met the minimum requirements outlined in ASTM F 432-83, Section 9.4.

The average displacement of the plates in the 6,000–15,000 pound load range was 0.050 inch (0.127 cm), while the average displacement in the 6,000–20,000 pound load range was 0.085 inch (0.216 cm).

The ultimate load on the plates with washers ranged from 27,900–29,100 pounds.

TEST NO. 2

Five 6"×6"×0.184" (15.2×15.2×0.467 cm) Diematic donut embossed bearing plates, including a 1⅜" (3.49 cm) diameter center aperture were tested with a washer in the form of cutout of a donut embossment on top the donut plates.

All plates met ASTM F 432-83 specifications.

The average displacement of the plates in the 6,000–15,000 pound load range was 0.021 inch (0.053 cm), while the average displacement in the 6,000–20,000 pound load range was 0.038 inch (0.096 cm).

The ultimate load on the plates with washers ranged from 24,100–31,300 pounds.

TEST NO. 3

Five 6"×6"×0.148" (15.2×15.2×0.376 cm) Tazwell Industries donut embossed high strength steel bearing plates, including a ¾" (3.49 cm) diameter center aperture were tested with a washer cutout in the form of a donut embossment on top of the bearing plates.

All plates tested met ASTM F 432-83 specifications.

The average displacement of the plates in the 6,000–15,000 pound load range was 0.013 inch (0.033 cm), while the average displacement in the 6,000–20,000 pound load range was 0.015 inch (0.038 cm).

The ultimate load of the plates ranged from 46,600–49,100 pounds.

Based upon the results of these tests, the reinforcing washer according to the invention and the roof bolt assembly incorporating the washer improves the ultimate load strength of the system between approximately 10,000 and 15,000 pounds or over 25% when compared to prior systems using flat washers.

Having described the presently preferred embodiments of the invention, it is to be understood that the invention may be otherwise embodied within the scope of the appended claims.

I claim:

1. A mine roof bolt assembly comprising:
    a roof bolt having a shaft portion;
    a bearing plate having one surface which substantially contacts the mine roof, an opposite surface having an annular embossment defining one of a convex and concave shape, and an aperture through which the roof bolt extends;
    an annular washer comprising a rigid member having a substantially planar central portion, a slightly tapered annular intermediate portion and terminating in an annular skirt portion, an aperture through which said roof bolt extends, a first surface of said washer being shaped to contact and complement a substantial portion of the embossment on the opposite surface of the bearing plate when installed with a bearing plate defining a convex shape and a second surface of said washer being shaped to contact and complement a substantial portion of the embossment on the opposite surface of the bearing plate when installed with a bearing plate defining a concave shape whereby the annular skirt portion of the rigid member extends at least beyond and contacts the embossment defining the concave shape; and means secured to the shaft portion of the bolt for holding the washer and the plate on the bolt and the plate against the mine roof.

2. A mine roof bolt assembly as set forth in claim 1 wherein the embossment on the opposite surface of the bearing plate defines a cup shape.

3. A mine roof bolt assembly as set forth in claim 1 wherein the embossment on the opposite surface of the bearing plate defines a donut shape.

4. A mine roof bolt assembly as set forth in claim 1 wherein the rigid member has a substantially uniform thickness of about ⅛ inch (0.317 cm).

5. A mine roof bolt assembly as set forth in claim 1 wherein the rigid member is made from hardened steel.

6. A mine roof bolt assembly as set forth in claim 1 wherein the securing means is a head of the bolt.

7. A mine roof bolt assembly as set forth in claim 1 wherein the securing means in a nut on the bolt.

8. In combination with a roof bolt having a head and a shaft portion and a bearing plate having a surface which substantially contacts with the mine roof, an opposite surface having an embossment defining one of a convex and concave shape, and an aperture through which the roof bolt extends, the improvement in a reinforcing washer comprising:

a rigid member formed in an annulus having a substantially planar central portion, a slightly tapered annular intermediate portion and terminating in an annular skirt portion, an aperture through which said roof bolt extends, a first surface of said washer being shaped to contact the complement a substantial portion of the embossment on the opposite surface of the bearing plate when installed with a bearing plate defining a convex shape and a second surface of said washer being shaped to contact and complement a substantial portion of the embossment on the opposite surface of the bearing plate when installed with a bearing plate defining a concave shape whereby the annular skirt portion of the rigid member extends at least beyond and contacts the embossment defining the concave shape so that the bolt can be driven into the mine roof with the plate thereagainst.

9. A washer as set forth in claim 8 wherein the rigid member is made from hardened steel.

* * * * *

UNITED STATES PATENT AND TRADEMARK OFFICE
CERTIFICATE OF CORRECTION

PATENT NO. : 4,708,559
DATED : November 24, 1987
INVENTOR(S) : Frank M. Locotos

It is certified that error appears in the above-identified patent and that said Letters Patent is hereby corrected as shown below:

Column 1, line 13, "comprises" should read --comprise--.

Column 5, line 24, "in" should read --is--.

Column 6, line 11, "the" should read --and--.

Signed and Sealed this

Twelfth Day of April, 1988

Attest:

DONALD J. QUIGG

*Attesting Officer*    *Commissioner of Patents and Trademarks*